UNITED STATES PATENT OFFICE.

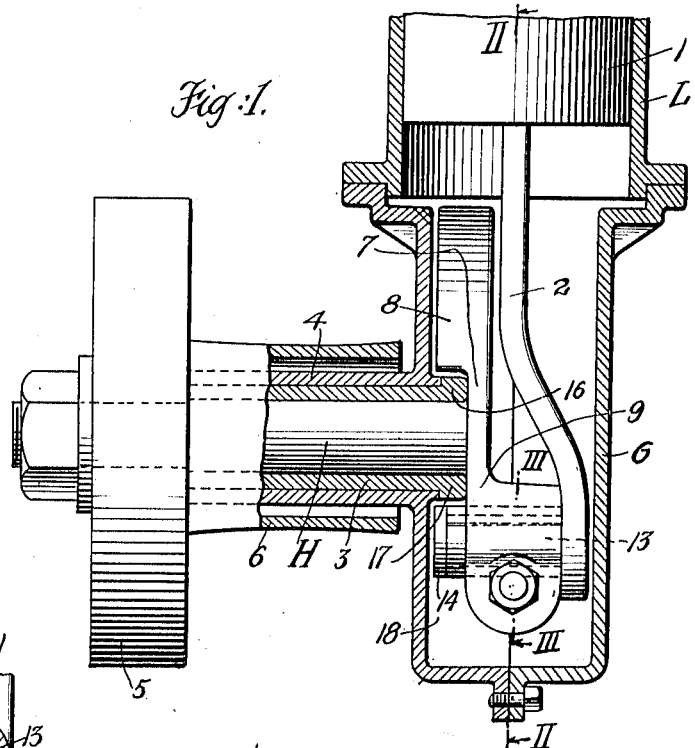

RALPH E. BATES, OF BROOKLYN, NEW YORK, ASSIGNOR TO OKAY MOTOR MANUFACTURING COMPANY, INC., OF BROOKLYN, NEW YORK, A CORPORATION OF NEW YORK.

COUNTERBALANCED CRANK-SHAFT.

1,314,497.      Specification of Letters Patent.      Patented Sept. 2, 1919.

Application filed November 23, 1916. Serial No. 132,966.

*To all whom it may concern:*

Be it known that I, RALPH E. BATES, residing at Brooklyn, in the conuty of Kings and State of New York, have invented certain new and useful Improvements in Counterbalanced Crank-Shafts, of which the following is a specification.

This invention relates to a motor construction.

The particular object of the invention is to provide a construction which is especially well adapted for use in driving a bicycle or the like as suggested in my co-pending application Serial Number 94,556.

A further object is to provide a crank shaft, casing, and associated parts so shaped and proportioned as to be capable of performing all their functions and so as to be reliable and highly efficient in operation and yet which will occupy a minimum of space.

A more detailed object is to provide improved means for joining the connecting rod of the motor with the crank shaft.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention:

Figure 1 is a vertical sectional view, partly in elevation, through a portion of a motor constructed in accordance with the provisions of this invention.

Fig. 2 is a vertical sectional view taken upon the plane of line II—II of Fig. 1, parts being illustrated in elevation; and Fig. 3 is a detail sectional view taken upon the plane of line III—III of Fig. 1.

Referring to the drawings for a detailed description of the structure which is illustrated therein, the reference character L indicates the engine cylinder. This may be of any type and carries the usual piston 1. A connecting rod 2 extends downwardly from the piston.

The reference character G indicates the crank casing, and the reference character H indicates the crank shaft. The crank shaft is mounted in a cylindrical bearing 3 which is in turn fitted into a sleeve 4 extending laterally from the crank casing. A flywheel 5 is mounted upon the outer end of the crank shaft and is formed with a sleevelike pulley 6, which extends in telescoped relation over the sleeve 4 toward the main portion of the crank casing and may constitute the drive pulley for engaging the bicycle tire, as clearly illustrated in the above-mentioned co-pending application.

Within the crank casing the end of the crank shaft is formed with a lateral extension 7 in one radial direction. This extension is formed with a counterbalance weight 8 thereon. A second extension 9 projects in an opposite radial direction and is formed to provide a split bearing sleeve 10 at its outer end. A two-part friction sleeve 11 is arranged within the sleeve 10 and a clamp bolt 12 is provided for clamping the sleeve 10 against the parts of the friction sleeve.

The lower end of the connecting rod 2 extends downwardly over the outer surface of the sleeve 10 and is provided with a wrist pin 13 which extends through the friction sleeve 11 and beyond the inner end thereof, the inner end of the wrist pin being formed with a head 14 for engaging behind the inner end surface of the friction sleeve.

In order to assemble the wrist pin in operative position the two halves or parts of the friction sleeve are laid about the wrist pin before the wrist pin is inserted within the sleeve 10. After the parts of the friction sleeve have been thus arranged the whole is then slipped into position within the sleeve 10 and the clamp bolt 12 tightened to the desired degree to retain the friction sleeve against movement, and to insure a proper wearing fit.

Since it is desirable that the friction sleeve be positively held against rotary movement during the operation of the device, and since also a better result is obtained by insuring that the parts of the friction sleeve be always inserted in a pre-determined position, it is desirable that one of the parts of the friction sleeve be formed with a flattened surface, as 15, adapted to engage the clamp bolt 12, as best seen in Fig. 3.

By this arrangement of parts the wrist pin may be quickly and easily assembled. When the parts are assembled the clamp bolt holds the friction sleeve and the friction sleeve engages the head 14 to retain the wrist pin against longitudinal displacement. Any wear can be readily taken up by tightening the clamp bolt 12.

The inner end, as 16, of the cylindrical bearing member 3 projects somewhat within the interior of the crank casing to provide a longer bearing for the crank shaft and to provide a point of support, as 17, for the crank shaft as near the central longitudinal axial line of the piston as possible. This projecting portion 16 also affords a desirable annular space 18 within the casing adapted for the unobstructed rotary movement of the weight 8. The end of the friction sleeve 11 also projects into this space and thereby provides for an increased length of bearing for the wrist pin. The head 15 of the wrist pin also travels in this space.

In order to bring the supporting point 17 as near the central axial line of the cylinder as possible, the lower end portion of the connecting rod is offset outwardly so that the bearing sleeve 10 may have a desirable length.

Having thus described my invention what I claim as new and desire to secure by Letters Patent is:

1. A device of the class described, comprising an engine cylinder, a crank casing, and a crank shaft, a lateral extension formed upon the end of the crank shaft within the crank casing the outer end of said extension being shaped to provide a split bearing, a piston within the engine cylinder, a connecting rod projecting from the piston into the crank casing, a wrist pin carried by the connecting rod extending laterally therefrom through said split bearing, a head formed upon the wrist pin beyond the split bearing, a two-part sleeve encircling the wrist pin within said split bearing being held against longitudinal movement in one direction by engagement with said head, and clamp means for clamping the parts of the split bearing against said sleeve to retain said sleeve against displacement and thereby to retain the wrist pin also against displacement.

2. A device of the class described, comprising an engine cylinder, a crank casing, and a crank shaft, the crank casing being formed to provide a bearing for the crank shaft having a portion extending into the crank casing to a point only slightly removed from the plane of the longitudinal central axis of the engine cylinder, a lateral extension formed upon the crank shaft within the crank casing being enlarged at its outer end to form a bearing out of alinement with the crank shaft, a piston within the engine cylinder, a connecting rod extending from the piston into the crank casing having its lower end portion offset to accommodate the enlarged end of the lateral extension from the crank shaft, a wrist pin fixed to the offset portion of the connecting rod projecting backwardly through said bearing, and a head formed upon the wrist pin beyond the bearing disposed to travel in the annular space within the crank casing defined by the inwardly projecting portion of the crank shaft bearing.

In testimony whereof I affix my signature in the presence of two witnesses.

RALPH E. BATES.

Witnesses:
MORRIS WEINBERG,
EMMA WEINBERG.

Copies of this patent may be obtained for five cents each, by addressing the "Commissioner of Patents, Washington, D. C."